United States Patent [19]
Hernandez, Jr.

[11] 3,737,846
[45] June 5, 1973

[54] AIRCRAFT GYROHORIZON INDICATOR WITH SIGNAL LAMP POSITIONAL ATTITUDE INDICATING MEANS

[76] Inventor: Ralph Hernandez, Jr., 420 Lincoln Road, Miami, Fla.

[22] Filed: July 20, 1970

[21] Appl. No.: 56,356

Related U.S. Application Data

[63] Continuation-in-part of Ser. No. 813,252, April 3, 1969.

[52] U.S. Cl. ............................................. 340/27 AT
[51] Int. Cl. ............................................... G08g 5/00
[58] Field of Search ........................ 340/27 AT, 27 R

[56] References Cited
UNITED STATES PATENTS 2,697,218  12/1954  Glenny ............................ 340/27 AT
2,745,091  5/1956   Leffler ............................. 340/27 AT Primary Examiner—Ralph D. Blakeslee
Attorney—Ernest H. Schmidt

[57] ABSTRACT

A combination gyrohorizon instrument for aircraft which visually indicates in addition to the dial display presentation of the instrument, by means of signal lamps appropriately placed with respect to the instrument dial and an audible signal indicative of energization of any one of the signal lamps, departures from straight and level flight that exceed reasonable limits of pitch and bank. The signal lamps, indicating "nose up," "nose down," "left wing down" and "right wing down" are in circuits energized by a first switching means controlled by the relative rotational position of the inner and outer gimbals of the instrument for sensing departure beyond reasonable safety limits in one direction or the other in the pitch axis, i. e., either "nose up" or "nose down" flight, and a second switch means controlled by the relative rotation position of the outer gimbal and the instrument casing for sensing departure beyond reasonable limits in the roll axis, i. e., either "left wing down" or "right wing down" flight.

9 Claims, 10 Drawing Figures

Patented June 5, 1973

INVENTOR.
RALPH HERNANDEZ JR.

BY Ernest H. Schmidt

ATTORNEY.

INVENTOR.
RALPH HERNANDEZ JR.

BY Ernest H. Schmidt

ATTORNEY.

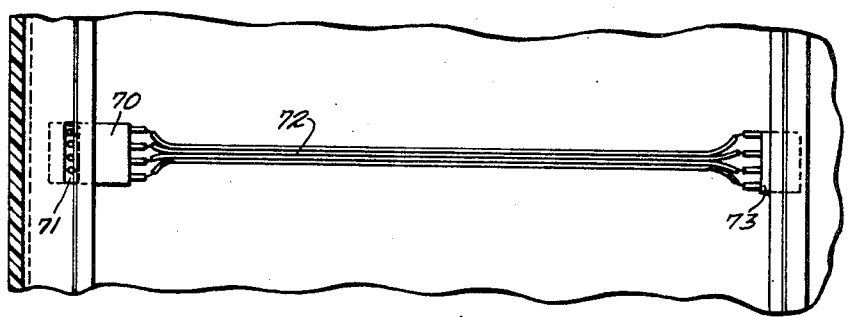
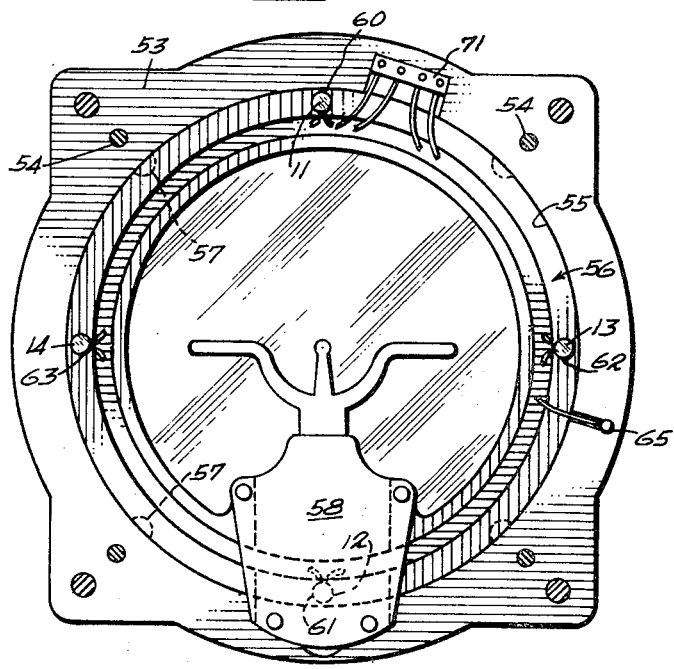
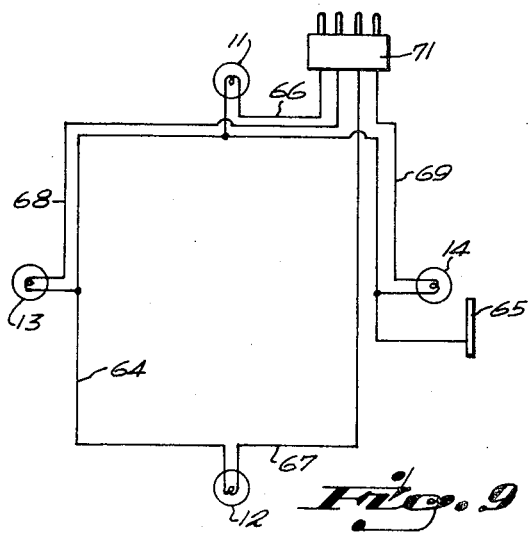

AIRCRAFT GYROHORIZON INDICATOR WITH SIGNAL LAMP POSITIONAL ATTITUDE INDICATING MEANS

This application is a continuation-in-part of U.S. Pat. application Ser. No. 813,252, filed Apr. 3, 1969, entitled Aircraft Gyrohorizon Indicator With Signal Lamp Positional Attitude Indicating Means.

This invention relates to flight control instruments and is directed to improvements in gyroscopic instruments such as artificial horizon instruments whereby the positional attitude of the aircraft when departing beyond pre-determined acceptable limits from straight and level flight, in addition to being displayed in the usual manner on the instrument dial, is indicated by the selective energization of appropriately located signal lamps in the instrument dial. In the above-identified patent application, there is described a combination gyrohorizon instrument of the character described wherein the signal lamp switching is effected by the provision of a first slip ring switch means controlled by the relative rotational position of the inner gimbal and the outer gimbal for sensing departure beyond resasonable limits in the pitch axis, and a second slip ring means controlled by the relative rotational position of the outer gimbal and the instrument casing for sensing departure beyond reasonable limits in the roll axis. In that application, the slip ring switch means comprises circumferential slip ring contact means fixed for rotation with the respective inner and outer gimbal axis, and relatively fixed elongated brush members arranged to make sliding contact with their respective circumferential slip rings. It is the principal object of the present invention to provide a sturdier, more dependable switching mechanism for sensing departure beyond reasonable limits in the pitch and roll axes.

A more particular object is to provide an improved combination gyro-controlled instrument of the character described wherein, instead of using slip ring contactor means on the pivotal axes of the inner and outer gimbals, slip contacts in the form of flat discs having concentric arcuate segmental conductive surface portions are utIlized in association with elongated brush members fixed with respect to the instrument housing and placed to be in sliding contact with their associated contact discs' conductive segments.

Still another object of the invention is to provide a warning device of the above nature including audible signal means operative when any one of the signal lamps is energized to warn the pilot of deviation from a normal flight path or attitude.

Yet another object is to provide a flight control indicator of the character described which will not present a warning indication under normal flight conditions, but which will indicate abnormal or dangerous maneuvers.

Other objects, features and advantages of the invention will be apparent from the following description when read with reference to the accompanying drawings. In the drawings, wherein like reference numerals denote corresponding parts throughout the several views:

FIG. 7 is a longitudinal cross-sectional view taken along the line 7—7 of FIG. 5 in the direction of the arrows and illustrating the plug-in connectors associated with the energizing circuitry for the indicating lamps in the lamp ring;

FIG. 8 is a vertical cross-sectional view taken along the line 8—8 of FIG. 5 and illustrating how the indicator lamp ring fits within the bezel formed within the inner surface of the instrument face plate;

FIG. 9 is an electrical schematic diagram of the indicator lamp ring; and

Figure 1:
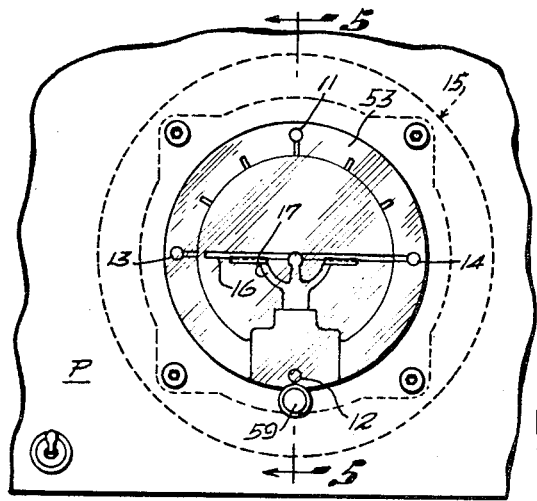
FIG. 1 is a partial view of an aircraft instrument panel illustrating a gyrohorizon indicator embodying the invention.

In brief, my invention provides, in combination with and as an adjunct to the usual attitude gyro-instrument 10 in an aircraft instrument panel P, visual indication of departure beyond reasonable limits in aircraft attitude with respect to both pitch and roll. Preferably, as illustrated in FIG. 1, "nose-up" and "nose down" signal lamps 11 and 12, representative of deviations from pitch axis attitude, will be located in extreme vertical end position within the instrument indicator face of the gyrohorizon instrument 10, and the "left wing down" and "right wing down" signal lamp 13, 14, representative of deviations from roll axis attitude, will be located at extreme left and right positions, respectively, within said instrument face, whereat said signal lamps will be best adapted to alert the pilot that corrective measures should be taken to maintain level flight.

Figure 2:
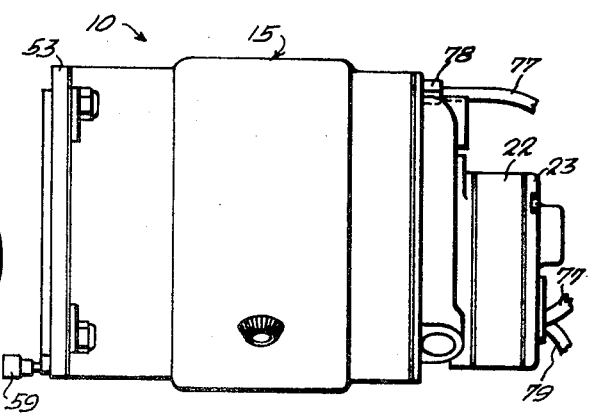
FIG. 2 illustrates, in side elevation and shown separately, a typical gyrohorizon indicator or artificial horizon instrument embodying the invention.

Since the construction and operation of artificial horizon gyros of the type herein modified in carrying out the invention is well known, only so much of the construction of the instrument as is deemed necessary for a full understanding of the invention is illustrated and described herein. Thus, as illustrated in FIGS. 1 and 2, the artificial horizon gyro or gyrohorizon instrument 10 comprises an instrument casing 15 in the face of which horizon bar 16 controlled by the gyromechanism represents the horizon, and the small FIG. 17 in the center of the dial represents the aircraft. The position of the airplane symbol relative to the horizon bar indicates the actual position of the aircraft with respect to the natural horizon.

Figure 5:
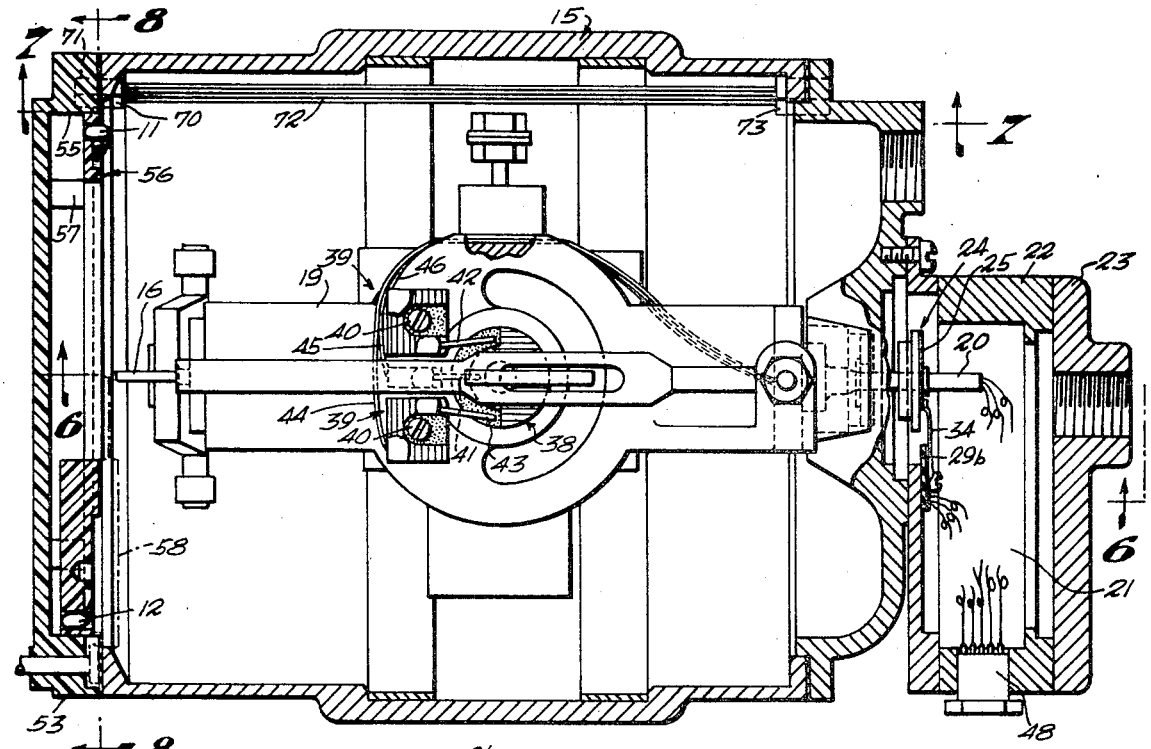
FIG. 5 is a vertical cross-sectional view of the modified gyrohorizon indicator, taken along the line 5—5 of FIG. 1 in the direction of the arrows and on an enlarged scale.
Figure 6:
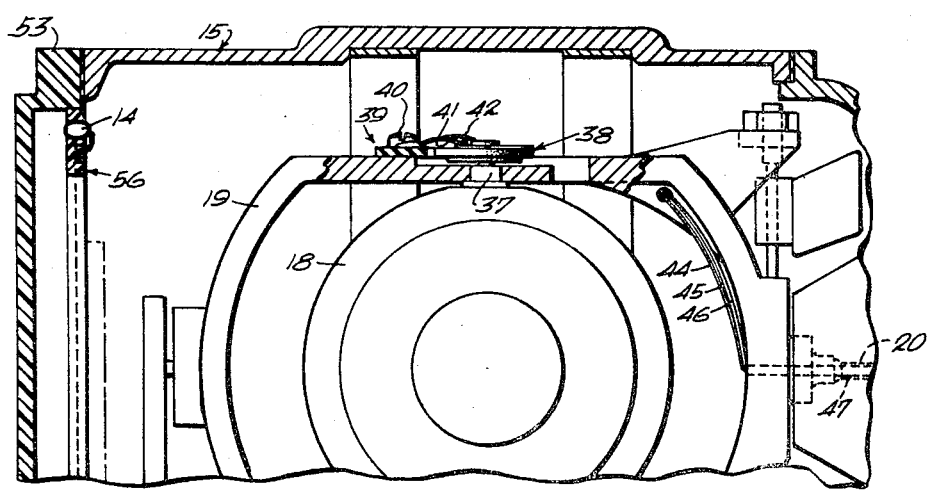
FIG. 6 is a longitudinal cross-sectional view taken along the line 6—6 of FIG. 5 in the direction of the arrows and illustrating the fixed contactor brush assembly and the associated rotary segmental contactor disk operating in response to mutual relative motion between the inner and outer gimbals.

Referring to FIGS. 5 and 6, the gyromechanism by means of which the horizon bar 16 is indicative of the natural horizon comprises an inner gimbal 18 within which the gyro rotar is contained with its spin axis maintained in a horizontal position, and an outer gimbal 19 journalled for axial rotation within the instrument casing 15 and having a rear gimbal shaft 20 extending through a rear end portion into an airflow chamber 21. The airflow chamber 21 in the modification of the instrument is somewhat extended in axial length by the provision of a cylindrical spacer sleeve 22 between the rear end of the instrument casing 15 and the usual airflow chamber end plate 23, to provide space for the segmental contactor disk and its associated brush assembly, as is hereinafter more particularly described.

Figure 3:
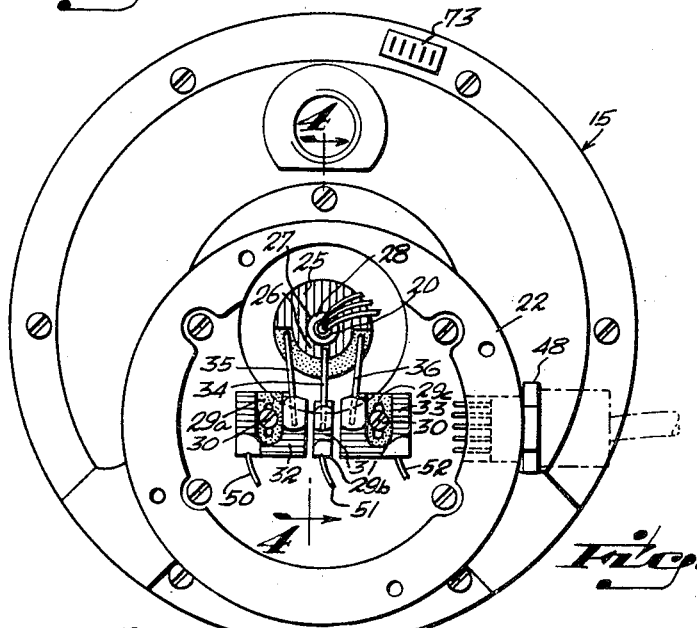
FIG. 3 is a rear end view, on an enlarged scale, of the gyrohorizon indicator shown in FIG. 1, the end cover being removed to show the rotary segmental contactor disk and the associated relatively fixed brush assembly.
Figure 4:
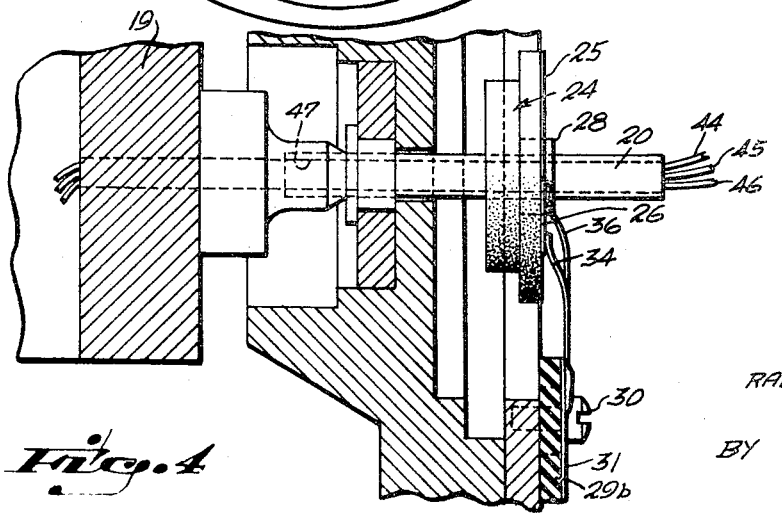
FIG. 4 is a fragmentary view, on an enlarged scale and with portions broken away, of the rear end spindle portion of the outer gimbal, illustrating constructional details of the segmental contact disk assembled thereto and the relatively fixed brush assembly with which it is cooperatively associated.

Referring now to FIGS. 3, 4 and 5 of the drawings, a centrally-apertured, segmental contactor disk 24, of an electrically non-conductive material, is press-fitted or otherwise affixed to the outwardly protecting end of the spindle shaft 20. Cemented or otherwise affixed upon the outer surface of the segmental contactor disk 24 is a substantially semi-circular conductive layer 25, such as of silver or gold-plated copper formed with an outwardly-projecting semi-annular contactor portion 26. The arcuate inner edge of the semi-annular portion 26 extends into the semi-circular portion 25 to provide a concentric circular opening 27 of somewhat greater diameter than the outer diameter of the spindle shaft 20, so as to be electrically insulated therefrom. As best illustrated in FIG. 4 the segmental contactor disk 24 is preferably provided with an outwardly-extending, circular boss 28, passing through and locating the electrically conductive layer 25, 26. Brush means is provided for closing the electrical energizing circuit including the "left wing down" signal lamp 13 and the "right wing down" signal lamp 14 under corresponding conditions as sensed by the gyrohorizon instrument 10. To this end, as best illustrated in FIGS. 3, 4 and 5, a pair of opposed outer insulating brush support blocks 29a, 29c are affixed against the rear end wall of the instrument casing, as by machine screws 30. As illustrated in FIG. 3, the support blocks 29a, 29c, which are of a dielectric material for electrical insulation of the brushes hereinbelow described, carry on their outer surfaces, cemented or otherwise affixed thereto, conductive layer portions 32, 33 respectively, insulated with respect to the instrument casing. To this end, portions of the conductive layers 32, 33 are cut away in the vicinity of the mounting machine screws 30. It is also to be noted that the openings in the non-conductive support blocks 29a, 29c through which attachment screws 30 extend are elongated to provide for individual adjustment of their associated contactor brushes, hereinafter described.

Arranged in spaced relation between the brush support blocks 29a, and 29c, and fixed with respect to the rear end wall of the instrument casing such as by being cemented thereto, is a central brush support block 29b, also of a dielectric, insulating material, carrying on its outer surface a conductive layer 31. A spring wire common contactor brush 34 is electrically connected at one end, such as by soldering, to the conductive strip 31, being so disposed that the tip of its outer end rides on the semi-annular portion 26 of the segmental contactor disk 24. Spring wire contactor brushes 35, 36 are similarly electrically connected with respect to conductive layers 32, 33, being so arranged that their tip ends ride outwardly of each side of the semi-annular portion 26 to be contactable with marginal peripheral end portions, respectively, of the semi-circular portion 25 of the segmental contactor disk 24 depending upon the relative rotative position of the spindle shaft 20 with respect to the instrument casing 15. It will be understood that, as illustrated in FIG. 3, when the aircraft is in level flight, irrespective of "nose-up" or "nose down" attitude as sensed by the gyrohorizon instrument 10, the relative positions of the segmental contactor disk 24 are such that neither of the contactor brushes 35, 36 will be in electrical contact with the semi-circular contactor portion 25 of the segmental contactor disk 24.

Means is also provided for closing the electrical energizing circuitry including the "nose-up" signal lamp 11 and the "nose down" signal lamp 12 under corresponding attitude positions exceeding predetermined limits of deviation in the pitch axis as sensed by the gyrohorizon indicator instrument 10. To this end, as illustrated in FIGS. 5 and 6 the outwardly projecting end of the inner gimbal journal shaft 37 has press-fitted or otherwise affixed thereto a segmental contactor disk 38 similar in all respects to the segmental contactor disk 24 secured to the spindle shaft 20 as hereinabove described, except as to slight differences in such dimensions as are of no consequence with respect to the mode of operation. Similarly, for cooperation with the segmental contactor disk 24, a brush assemblage 39 comprising opposed outer and a central brush support blocks is affixed against the outer surface of the outer gimbal 19 in the vicinity of inner gimbal journal shaft 27, the outer support blocks being adjustably attached as by machine screws 40. The brush assemblage 39 comprises a common contactor brush 41, corresponding to the common contactor brush 34 in FIG. 3, and outer contactor brushes 42, 43 corresponding to contactor brushes 35, 36 of the brush assemblage associated with the outer gimbal spindle shaft 20. Here again, the brush assemblage 39 is similar in construction and operation to the above-described brush assemblage associated with the outer gimbal spindle shaft, 20 differing only in non-consequential respects, such as dimensions. It is to be understood that, as is best illustrated in FIG. 5, when the aircraft is in level altitude in the pitch axis, irrespective of roll or "left wing down" or "right wing down" attitude as sensed by the gyrohorizon instrument indicator 10, the relative positions of the segmental contactor disk 38 and the brush assembly 39 are such that neither of the contactor brushes 42, 43 will be in electrical contact with the electrically conductive semi-circular outer layer portion of the segmental contactor disk 38.

As illustrated in FIGS. 4, 5 and 6, common contactor brush 41 and outer contactor brushes 42 and 43 are in electrical connection, respectively, with flexible conductors 45, 46 and 44 which extend through an axial opening in the outer gimbal spindle shaft 20 for connection with contact terminals of a five conductor separable connector member 48 fitted in the side wall of the cylindrical spacer sleeve 22. As illustrated in FIG. 3, common contactor brush 34 and spring wire contactor brushes 35 and 36 are in electrical connection with electrical conductors 51, 50 and 52, respectively, for connection with the connector receptacle 48. In this connection it is to be noted, as is set forth in the electrical schematic diagram of FIG. 6, hereinbelow more particularly described, that the common contactor brush conductors 45 and 51 are connected together at a single terminal of the connector plug receptacle 48.

Referring now to FIGS. 1, 2 and 5 through 9, it will be seen that the invention comprehends the provision of a novel face plate or bezel 53 which is preferably fabricated of a tough, non-electrically conductive synthetic material such as Plexiglas. The bezel 53 is removably secured against the front end of the casing 15 as by machine screws 54. As best illustrated in FIGS. 5, 6 and 8, the inner surface of the bezel 53 is formed with a cylindrical recess 55 for the press-fit reception of an annular lamp ring 56. The bottom of the lamp ring recess 55 is formed with four, equidistantly-peripherally-spaced, upstanding, stop portions 57 against which inner peripheral portions of the annular lamp ring 56 seats in its assembly. The lamp ring 56, secured to the lower end thereof and extending partially to the rear has a gear mechanism 58 controlled by an adjustment knob 59 (see FIGS. 1 and 2) for manually setting the height of the associated aircraft FIG. 17 as seen through the front of the instrument.

As illustrated in FIGS. 5, 6 and 8 the annular lamp ring 56 is provided with upper and lower signal lamp openings 60 and 61, and left and right side signal lamp openings 62, and 63, respectively, within which, respectively, signal lamps 11, 12, 13 and 14 are fitted. Preferably, lamps 11 through 14 will give a red light, visible at their respective locations through the instrument bezel 53 when warning of any departures from straight and level flight exceeding predetermined resonable limit of pitch and bank.

As best illustrated in FIG. 9, one terminal each of the signal lamps 11 through 14 are connected by means of a common electrical conductor 64 to a common connector pin 65 fixed with respect to an extending rearwardly of a rim portion of the bezel 53 for reception in a connector receptacle fitted in a front annular rim portion of the metal instrument casing 15 for establishing an electrical ground connecting to said casing. The remaining energization terminals of the indicator lamps 11 through 14 are electrically connected, through respective electrical conductors 66 through 69, to a four-conductor connector plug 71 fitted within a recess in the annular rear surface portion of the bezel 53. As illuatrated in FIG. 5, the annular front face of the instrument casing 15 is fitted with an appropriately placed four-conductor connector receptacle 70 adapted to make plug-in electrical connection with the connector plug 71 when the bezel 53 is fitted and secured in place by machine screws 54. The connector terminals of the four-conductor connector receptacle 70 connect with a four-conductor cable 72 which extends rearwardly along the inside of the instrument casing 15 to terminate in electrical connection with terminals of a four-conductor connector receptacle 73 fitted at the rear of the instrument in a marginal outer portion thereof (see FIGS. 5 and 7).

Figure 10:
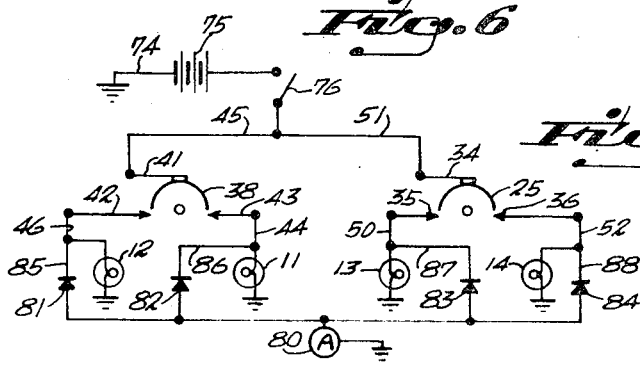
FIG. 10 is an electrical schematic diagram of the device.

Referring now to FIG. 10 and considering the electrical circuitry, the same comprises a ground circuit including a common ground conductor 74 connected to the negative terminal of the aircraft battery 75. The positive or "hot" terminal of the battery 75 connects through series on-off switch 76 and conductors 45 and 51 to respective contactor brushes 41 and 34. One terminal each of the signal lamps 11, 12 connect with their respective contactor brushes 43, 42 through respective conductors 44 and 46. Similarly, one terminal each of the signal lamps 13, 14 connect with their respective contactor brushes 35, 36 through respective conductors 50, 52. As described above, the remaining terminals of the signal lamps 11, 12, 13 and 14 are returned to ground through common conductor 64 and common connector pin 65 to complete the signal lamp energization. In this connection, with reference to FIG. 2, interconnection cable 77 making plug-in connection with the connector receptacle 73 through receptacle plug 78, and cable 79 extending from the instrument and making electrical connection with the aircraft battery and such other circuit components as are not contained within the instrument casing, are provided.

Audible signal means is also provided for in the circuitry to give a sound alarm at the same time that any one of the signal lamps 11, 12, 13 or 14 is energized to present a visual indication of departure beyond reasonable limits from positional attitude. To this end a sounding device audible alarm 80 is provided, one energization terminal of which is connected, through individual diodes 81, 82, 83 and 84, to the ungrounded terminals of each of the signal lamps 11, 12, 13 and 14 by means of individual conductors 85, 86, 87 and 88. The audible alarm device 80 is preferably of the type giving an interrupted low-pitched, high-intensity signal that commands instant attention. In operation, energization of any one of the signal lamps 11, 12, 13 and 14 also completes an energization circuit to the alarm device 80 through associated respective diodes 81, 82, 83 or 84. The diodes associated with the three remaining and unenergized signal lamps block reverse current flow, to prevent improper energization of more than one signal lamp at a time.

While the invention is illustrated and described herein as used in conjunction with a gyrohorizon instrument, it is to be understood that the device can also be applied to other gyro-controlled instruments, such as glide-slope instruments, wherein signal lamps and/or audible signal devices can be energized as a warning upon departure from normal flight path and/or attitude of the aircraft. In brief, the invention can be applied to any and all gyro-controlled aircraft instruments to present visual or audible indication of departure from a normal flight path and/or attitude.

What I claim as new and desire to secure by Letters Patent is:

1. A device for signalling departure beyond predetermined limits from straight and level flight as indicated by a gyrohorizon instrument having a casing, an outer gimbal pivotally journalled within the casing, the relative rotational position thereof, with respect to the casing, being determinative of deviation of an aircraft in the roll axis, and an inner gimbal, pivotally journalled within the outer gimbal about an axis perpendicular to the journal axis of the outer gimbal, the relative rotational position thereof, with respect to the outer gimbal, being determinative of deviation of an aircraft in the pitch axis; the combination comprising, a first pair of signal lamps indicating, when energized, "nose up" and "nose down" aircraft positional attitude, respectively, in the pitch axis, a second pair of signal lamps for indicating, when energized, "left wing down" and "right wing down" aircraft positional attitude, respectively, in the roll axis, a first means controlled by the relative position of said inner gimbal with respect to said outer gimbal for selectively energizing one or the other of said first signal lamps in accordance with corresponding "nose up" and "nose down" aircraft positional attitude, a second means controlled by the relative position of said outer gimbal with respect to said casing for selectively energizing one or the other of said second pair of signal lamps in accordance with corresponding "left wing down" and "right wing down" aircraft positional attitude, said first energizing means comprising a first energizing circuit for each of said first pair of signal lamps, normally open-circuit first switch means in each of said first energizing circuits, means controlled by the relative movement of said inner gimbal with respect to said outer gimbal in one direction or the other to selectively actuate said first switch means, second energizing circuits for each of said second pair of signal lamps, normally open-circuit second switch means in each of said second energizing circuits, means controlled by the relative movement of said outer gimbal with respect to said casing in one direction or the other to selectively actuate said second switch means, said means for actuating said first switch means comprising a first arcuate contact member coaxially arranged with respect to the axis of rotation of said inner gimbal and fixed thereto for rotation in unison therewith, and a first pair of electrical brush members, one at each side of said first arcuate conductor and adapted to make selective contact therewith at their outer ends said brush members being individually adjustably secured at their inner ends with respect to said outer gimbal.

2. A device for signalling departure beyond predetermined limits from straight and level flight as defined in claim 1, wherein said means for actuating said first switch means further comprises a coaxial annular contact portion integrally formed with said first arcuate contact member, and a first common electrical brush member in continuous electrical contact with said annular contact portion at one end and having its other end secured with respect to said outer gimbal.

3. A device for signalling departure beyond predetermined limits from straight and level flight as defined in claim 2, comprising a transparent bezel member secured at the dial end of the instrument casing, and means for mounting said signal lamps within the face of said bezel so that said first pair of signal lamps are mounted in upper and lower diametrically-opposed zones in said bezel, and said second pair of signal lamps are mounted in diametrically-opposed zones at each side of said bezel.

4. A device for signalling departure beyond predetermined limits from straight and level flight as defined in claim 3, wherein said signal lamps mounting means comprises an annular lamp ring wherein said signal lamps are mounted in 90 circular degree mutually spaced peripheral disposition about said ring, and an annular seat provided within the inside of said bezel for receiving and positionally retaining said annular ring.

5. A device for signalling departure beyond predetermined limits from straight and level flight as defined in claim 2, wherein said means for actuating said second switch means comprises a second arcuate contact member coaxially arranged with respect to the axis of rotation of said inner gimbal and affixed thereto for rotation in unison therewith, and a second pair of electrical brush members, one at each side of said second arcuate conductor and adapted to make selective contact therewith at their outer ends said second brush members being individually adjustably secured at their inner end with respect to said casing.

6. A device for signalling departure beyond predetermined limits from straight and level flight as defined in claim 5, wherein said means for actuating said second switch means further comprises a second coaxial annular contact portion integrally formed with said second arcuate contact member, and a second common electrical brush member in continuous electrical contact with said second annular contact portion at one end and having its other end secured with respect to said casing.

7. A device for signalling departure beyond predetermined limits from straight and level flight as defined in claim 6, comprising a transparent bezel member secured at the dial end of the instrument casing, and means for mounting said signal lamps within the face of said bezel so that said first pair of signal lamps are mounted in upper and lower diametrically opposed zones in said bezel, and said second pair of signal lamps are mounted in diametrically opposed zones at each side of said bezel.

8. A device for signalling departure beyond predetermined limits from straight and level flight as defined in claim 7, wherein said signal lamps mounting means comprises an annular lamp ring wherein said signal lamps are mounted in 90 circular degree mutually spaced peripheral disposition about said ring, and an annular seat provided within the inside of said bezel for receiving and positionally retaining said annular ring.

9. A device for signalling departure beyond predetermined limits from straight and level flight as defined in claim 8, wherein said energization circuit includes an audible signal device and means for simultaneously energizing said audible signal device upon the energization of any one of signal lamps.

* * * * *